United States Patent [19]

Donlin

[11] Patent Number: 5,779,910
[45] Date of Patent: Jul. 14, 1998

[54] ENHANCED FLOCCULATION OF MINERAL SLURRY WITH POLYMER BLENDS

[75] Inventor: William T. Donlin, Norwalk, Conn.

[73] Assignee: Cytec Technology Corp., Wilmington, Del.

[21] Appl. No.: 629,244

[22] Filed: Apr. 8, 1996

[51] Int. Cl.$^6$ ........................ B01D 21/01
[52] U.S. Cl. .................. 210/726; 209/5; 210/732; 210/734
[58] Field of Search .................. 209/5; 210/723, 210/726, 727, 732, 734, 735

[56] References Cited

U.S. PATENT DOCUMENTS

| | | | |
|---|---|---|---|
| Re. 28,807 | 5/1976 | Panzer et al. | 260/2 BP |
| Re. 28,808 | 5/1976 | Panzer et al. | 260/2 BP |
| 3,377,274 | 4/1968 | Burke et al. | 210/727 |
| 4,092,467 | 5/1978 | Welcher et al. | 526/80 |
| 4,555,329 | 11/1985 | Sykes et al. | 209/5 |
| 4,906,386 | 3/1990 | Vasconcellos et al. | 210/727 |
| 4,956,399 | 9/1990 | Kozakiewicz et al. | 523/223 |
| 5,178,770 | 1/1993 | Chung | 210/732 X |
| 5,286,806 | 2/1994 | Neff et al. | 525/369 |
| 5,360,600 | 11/1994 | Hancock et al. | 210/735 X |
| 5,653,886 | 8/1997 | Kerr et al. | 210/727 |

FOREIGN PATENT DOCUMENTS

| | | | |
|---|---|---|---|
| 58-133899 | 8/1983 | Japan | 210/723 |
| WO 86/04585 | 8/1986 | WIPO | 210/726 |

*Primary Examiner*—Janice L. Krizek
*Attorney, Agent, or Firm*—Pennie & Edmonds LLP

[57] ABSTRACT

Mineral slurries such as coal refuse are flocculated to separate solids therefrom by adding a blend of high and low molecular weight cationic flocculants followed by a high molecular weight anionic flocculant.

12 Claims, No Drawings

ENHANCED FLOCCULATION OF MINERAL SLURRY WITH POLYMER BLENDS

BACKGROUND OF THE INVENTION

The treatment of mineral slurries such as coal refuse to separate coal from other solids therein such as gangue, clay and the like at one time was considered to be an economically attractive process, see for example, U.S. Pat. No. 4,555,329.

Due to the number of unforeseen circumstances however, the recovery of low levels of fine coal from coal refuse has become less viable economically and has given way to the need to provide a cleaner, less contaminated, aqueous recycle stream in coal processing plants. Because the aqueous streams in these coal plants are self-contained, i.e., water is not discarded to any great extent, decontamination of the continually recycled water is of prime concern and, therefore, it is essential that the aqueous recycle streams be as pure as possible so as to prevent problems in other areas of the plant. At present, it is the solids which contaminate the aqueous streams which are discarded and because these solids are primarily minerals already removed from the earth, replacement thereof back into the earth as landfill, etc., is ecologically acceptable.

SUMMARY OF THE INVENTION

The instant invention comprises a method for effectively removing solids from mineral slurries such as coal refuse by contacting the slurry with a blend of a low molecular weight cationic flocculant and a high molecular weight cationic flocculant and then treating the resultant flocculated substrate with a high molecular weight anionic flocculant. This process results in the rapid settling of suspended solids and a high clarity supernatant recyclable aqueous stream.

DESCRIPTION OF THE INVENTION INCLUDING PREFERRED EMBODIMENTS

The present invention is directed to a method of separating solids from a mineral slurry which comprises:

a) adding thereto a blend of a low molecular weight, cationic flocculant and a high molecular weight, cationic flocculant to form a substrate;

b) adding to said substrate a high molecular weight, anionic flocculant to form a settled solids phase and an aqueous phase and c) separating said solid and aqueous phases.

A. The Low Molecular Weight, Cationic Flocculants.

The low molecular weight, cationic polymers useful in the present invention are those having a weight average molecular weight below about 1,000,000, preferably below about 750,000. They are prepared from monomers which include diallyldimethylammonium chloride; acryloxyethyltrimethylammonium chloride; (meth)acrylates of N,N-dialkylaminoalkyl compounds, quaternaries and salts thereof; N,N-dialkylaminoalkyl(meth)acrylamides, salts and quaternaries thereof, such as N,N-dialkylaminoethylacrylamides; (meth)acrylamidopropyltrimethylammonium chloride, and the like. Cationic monomers are generally of the following formulae:

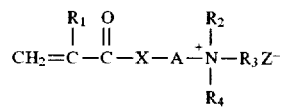

wherein $R_1$ is hydrogen or methyl, $R_2$ is hydrogen or lower alkyl of $C_1$ to $C_4$, $R_3$ and/or $R_4$ are hydrogen, alkyl of $C_1$ to $C_4$, aryl or hydroxyethyl and $R_2$ and $R_3$ or $R_2$ and $R_4$ can combine to form a cyclic ring containing one or more hetero atoms, and Z is the conjugate base of an acid, X is oxygen or —NR1—wherein R1 is as defined above, and A is an alkylene group of $C_1$ to $C_{12}$; or

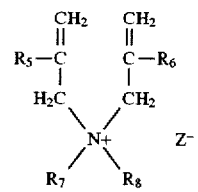

where $R_5$ and $R_6$ are hydrogen or methyl, $R_7$ is hydrogen, alkyl of $C_1$ to $C_{12}$ or benzyl, and $R_8$ is hydrogen, alkyl of $C_1$ to $C_{12}$, benzyl or hydroxyethyl; and Z is as defined above, and which may be polymerized alone or together or individually with such non-ionic comonomers as (meth)acrylamide, etc. Preferred low molecular weight, cationic polymers are those produced from diallyldimethyl ammonium chloride including its homopolymer.

The dimethyldiallyammonium halide (DADM) polymers are known in the art, examples thereof being disclosed in U.S. Pat. No. 4,092,467 hereby incorporated herein by reference. These polymers are homopolymers of DADM or copolymers thereof with such monomers as acrylamide, vinyl pyrrolidone, etc., in amounts up to about 98% of the resultant polymer.

Other examples of such cationic polymers are:

a) Amine-epihalohydrin condensates as described in U.S. Pat. Nos. Re 28,807 and 28,808. Preferred species are those formed from dimethylamine and epichlorohydrin.

b) Melamine/formaldehyde acid colloids.

c) Homopolymers of vinylic cationic monomers such as vinyl imidazoliums, N- or C-substituted d) Polyethylenimines which are quaternized or highly protonated.

B. The High Molecular Weight Cationic Polymers

The high molecular weight, cationic polymers useful in the present invention are those having a weight average molecular weight of over about 1 million, preferably over about 3 million and include polymers produced from the same monomers as set forth above with regard to the low molecular weight, cationic polymers. Preferred high molecular weight, cationic polymers include the quaternized, Mannich acrylamide polymers and copolymers of (meth)acrylamide with an acryloxyalkyl trimethylammonium halides. Most preferable are microemulsions of quaternized Mannich acrylamide polymers such as those disclosed in U.S. Pat. No. 4,956,399. Generally, these polymers are homopolymers of acrylamide or copolymers thereof with such comonomers as acrylonitrile, methyacrylamide, acrylic acid, etc., in amounts up to about 50%, preferably 5–50% of the resultant copolymer. The polymers are chemically modified to provide dimethylaminomethyl groups to the extent that the polymer contains 25–100 mol percent of these groups, preferably at least 40 mol percent. They may be quaternized with known quaternizing agents as taught in the above-referenced U.S. Pat. No. 4,956,399.

The ratio of the high molecular weight, cationic flocculant to the low molecular weight, cationic flocculant, on a real solids basis, should range from about 15:1 to about 1:1, preferably from about 12:1 to about 2:1, respectively.

It is also preferred to add the high and low molecular weight, cationic flocculants as a physical blend, however, it is also feasible to add the two flocculants individually with either one being added first. The two flocculants should be added, however, as near the same time as practical so as to attain their cooperative effect.

The total amount of high and low molecular weight, cationic flocculant added to the mineral slurry should range from about 2 to about 20 parts per million, preferably from about 3 to 15 parts per million.

C. The High Molecular Weight, Anionic Flocculants

The high molecular weight, anionic flocculants useful in the present invention are those having a weight average molecular weight of at least about 5 million, preferably at least about 10 million. They are well known in the art and are generally prepared from anionic ethylenically unsaturated compounds. Generally, they comprise water-soluble carboxylic or sulfonic acids such as (meth)acrylic acid; styrene sulfonic acid; itaconic acid; 2-acrylamido-2-methylpropanesulfonic acid; sulfoalkyl(meth)acrylic acid; the salts thereof or other water-soluble forms of these or sulfomethylated (meth) acrylamides and the like.

They may be prepared as homopolymers of these monomers or may be copolymerized with non-ionic copolymerizable monomers such as (meth) acrylamide in amounts such as to provide the necessary anionicity to the resultant polymer.

A preferred class of high molecular weight, anionic flocculants are those produced by copolymerizing acrylamide and acrylic acid or its salts such as to impart at least about 5% anionicity to the resultant copolymer.

Substantially equivalent polymers, although of higher weight average molecular weight may be produced by polymerizing (meth) acrylamide per se (or with another non-ionic monomer) in emulsion form and hydrolyzing the resultant emulsified polymer so as to convert a portion of the amide groups thereof to carboxyl groups such as is taught in U.S. Pat. No. 5,286,806, incorporated herein by reference.

The amount of high molecular weight, anionic flocculant added to the mineral slurry should range from about 1–10 parts per million, preferably from about 2–8 parts per million.

The high molecular weight, anionic flocculant is preferably added after the addition of the high and low molecular weight, cationic flocculants although the reverse addition of these additives may be effected without detrimentally interfering with the overall reduction of the amount of solids suspended in the aqueous slurry.

Agitation of the mineral slurry after the addition of any or all of the flocculants used in the practice of the process of the present invention is preferred although adequate solids separation is also effected with no or minor agitation.

The following examples are set forth for purposes of illustration only and are not to be construed as limitations on the present invention except as set forth in the appended claims. All parts and percentages are by weight unless otherwise specified.

In the examples, the substrate is a coal refuse which is actually the solid waste generated in a coal processing/preparation plant. A typical composition includes: fine coal, vein pyrite, shale, clay, sand, etc. The pyrite, etc., (other than the fine coal) are often termed "gangue", i.e., the minerals and rock which are mined with an ore, but are valueless themselves or used only as a by-product.

In the plant, the application is a basic solids/liquid separation carried out in an above ground (or in ground) clarifier referred to as a thickener, i.e. to thicken their incoming solids. Typically, the incoming solids (to the thickener) range from approximately 3%–9%. Once thickened, the solids are usually pumped to an impoundment (holding lagoon) which allows for further water breakout/separation by long retention time.

Flocculant "treatments" used in refuse thickening/settling should be thought of as processing aids for water reclamation. The only system losses are due to evaporation and leaks in pump seals, etc. It is not unusual for a coal preparation plant with a small overall footprint to circulate between 8–10 million gallons of water a day, although the circuit may only hold or circulate ½ million gallons of water an hour.

Test Procedure

An aliquot of well mixed substrate is taken in either a beaker or a graduated cylinder. A 500 ml–1000 ml sample size is convenient.

The sampled substrate is conditioned with the dual component cationic blend which involves a continuous mixing of the substrate, the addition of the cationic treatment, mixing at a high degree of mixing for approximately 15 seconds. During the initial period, an initial small floc is usually observed.

The conditioned substrate, still mixing at a high level, is then treated with the anionic component. Once added, the anionic treatment is also allowed to mix for approximately 10–15 seconds.

In the next step, mixing of the completely treated substrate is reduced to a very low level for approximately 5–10 seconds. This allows floc growth and the capture of finer particles. In all cases mixing levels/flocculant addition levels are adjusted as required to approximate plant use levels and conditions.

At the end of the slow mix period, mixing is stopped and flocculant size and capture of fines assessed visually. The settling rate of the flocculated substrate is measured from the zero or starting point to a designated point in the beaker or graduated cylinder. This measurement is time based and is converted into the dimension of feet/minutes.

After a reasonable timeframe (usually 2–5 minutes) the clarity of the supernatant is determined via turbidity. This gives a good assessment of the treatment's ability to clarify the substrate.

Following is a designation of the flocculants used in the examples.

1. Polymer A=poly (diallydimethylammonium chloride) having a weight average molecular weight of approximately 300,000; 16% polymer solids.
2. Polymer B=an acrylic acid/acrylamide/methylacrylate polymer (70125/5) of 31.4% polymer solids and a weight average molecular weight of about 16 million.
3. Polymer C=an acrylamide homopolymer solution of 23% polymer solids and a weight average molecular weight of slightly less than 16 million.
4. Polymer D=an emulsion copolymer of diallydimethylammonium chloride and acrylamide (98/2) at 45% polymer solids and weight average molecular weight of just under 250,000.

5. Polymer E=an acrylamide/acrylic acid copolymer of 31.7% polymer solids and a weight average molecular weight of about 16 million.
6. Polymer F=a terpolymer of acrylamide/acrylic acid/methyl acrylate (40/40/20) having a 29.7% polymer solids and a weight average molecular weight of 16 million.
7. Polymer G=an acrylic acid/acrylamide emulsion copolymer (34/66) prepared by hydrolyzing polyacrylamide, stabilized with acetic acid and having 21% polymer solids and a weight average molecular weight of 16 million (G*=dry Polymer G).
8. Polymer H=same as Polymer G but having 28% polymer solids and no acetic acid stabilizer.
9. Polymer I=a quaternized Mannich acrylamide polymer emulsion containing 80% cationicity, having 27% solids and a weight average molecular weight of about 11–14 million.
10. Polymer J=a sodium acrylate/acrylamide copolymer (30/70) solution having 25% polymer solids and a weight average molecular weight of about 16 million.
11. Polymer K=similar to Polymer G but having 40% carboxyl content.
12. Polymer L=similar to Polymer G but having 45% carboxyl content.
13. Polymer M=a dry polymer of acrylic acid and acrylamide (35/65) having a weight average molecular weight of 15–17 million.
14. Polymer N=similar to Polymer H but having a 20–25% acrylic acid level.
15. Polymer O=a copolymer solution of acrylamide and acryloxymethyltrimethylammonium chloride (45/55) having a polymer solids content of 41% and a weight average molecular weight of 5 million.

TABLE I

Coal Refuse - 6.1% Solids

Dosage - ppm (real)

| Example | Cationic Flocculant(s) | Anionic Flocculant | Settling Rate (sec.) | Clarity (NTU) |
|---|---|---|---|---|
| 1C | A-2.64 | G-1.15 | 20 | 56 |
| 2C | A-2.98 | G-1.15 | 13 | 48 |
| 3C | A-3.3 | G-1.15 | 11 | 44 |
| 4C | A-2.31 | G-0.77 | 5 | 34 |
| 5C | A-2.31 | G-1.15 | 6 | 55 |
| 6C | A-2.31 | G-1.54 | 34 | 100 |
| 7C | A-2.31 | H-0.56 | 60 | 116 |
| 8C | A-2.31 | H-1.12 | 33 | 97 |
| 9C | A-2.31 | H-1.68 | 15 | 67 |
| 10C | D-4.5 | G-1.15 | 6 | 55 |
| 11C | D-5.4 | G-1.15 | 5 | 31 |
| 12C | D-6.3 | G-1.15 | 5 | 32 |
| 13C | I-2.68 | G-1.15 | 9 | 111 |
| 14C | I-3.22 | G-1.15 | 8 | 106 |
| 15C | I-3.75 | G-1.15 | 4 | 62 |
| 16 | I-2.68 A-0.22 | G-1.15 | 3 | 44 |
| 17 | I-3.22 A-0.25 | G-1.15 | 2 | 40 |
| 18 | I-3.75 A-0.30 | G-1.15 | 1 | 36 |
| 19 | I-2.68 A-0.43 | G-1.15 | 2 | 39 |
| 20 | I-3.22 A-0.51 | G-1.15 | 2 | 29 |
| 21 | I-3.75 A-0.61 | G-1.15 | 1 | 31 |

TABLE I-continued

Coal Refuse - 6.1% Solids

Dosage - ppm (real)

| Example | Cationic Flocculant(s) | Anionic Flocculant | Settling Rate (sec.) | Clarity (NTU) |
|---|---|---|---|---|
| 22 | I-2.68 A-0.66 | G-1.15 | 1 | 30 |
| 23 | I-3.22 A-0.79 | G-1.15 | 2 | 27 |
| 24 | I-3.75 A-0.95 | G-1.15 | 3 | 26 |

TABLE II

Coal Refuse - 9.35% Solids

Dosage - ppm (real)

| Example | Cationic Flocculant(s) | Anionic Flocculant | Settling Rate (sec.) | Clarity (NTU) |
|---|---|---|---|---|
| 24C | A-1.65 | G-1.15 | 30 | 197 |
| 25C | A-1.98 | G-1.15 | 24 | 120 |
| 26C | A-2.31 | G-1.15 | 17 | 83 |
| 27C | I-2.68 | G-1.15 | 20 | 216 |
| 28C | I-3.22 | G-1.15 | 13 | 159 |
| 29C | I-3.75 | G-1.15 | 11 | 139 |
| 30 | I-2.68 A-0.26 | H-1.15 | 12 | 129 |
| 31 | I-3.22 A-0.31 | G-1.15 | 10 | 113 |
| 32 | I-3.75 A-0.38 | G-1.15 | 9 | 109 |
| 33 | I-2.68 A-0.55 | G-1.15 | 15 | 109 |
| 34 | I-3.22 A-0.64 | G-1.15 | 10 | 98 |
| 35 | I-3.75 A-0.76 | G-1.15 | 5 | 50 |
| 36 | I-2.68 A-0.83 | G-1.15 | 6 | 91 |
| 37 | I-3.22 A-0.99 | G-1.15 | 12 | 79 |
| 38 | I-3.75 A-1.16 | G-1.15 | 6 | 50 |
| 39 | I-2.68 A-1.09 | G-1.15 | 8 | 71 |
| 40 | I-3.22 A-1.30 | G-1.15 | 4 | 52 |
| 41 | I-3.75 A-1.50 | G-1.15 | 2 | 37 |

TABLE III

Coal Refuse - 4.2% Solids

Dosage - ppm (real)

| Example | Cationic Flocculant(s) | Anionic Flocculant | Settling Rate (sec.) | Clarity (NTU) |
|---|---|---|---|---|
| 42C | A-1.32 | H-0.56 | 35 | 151 |
| 43C | A-1.32 | H-1.12 | 5 | 67 |
| 44C | A-1.32 | H-1.68 | 2 | 50 |
| 45C | A-1.32 | J-0.50 | 48 | 136 |
| 46C | A-1.32 | J-1.00 | 15 | 86 |
| 47C | A-1.32 | J-1.50 | 3 | 40 |
| 48C | D-1.60 | H-1.12 | 5 | 78 |
| 49C | D-2.40 | H-1.12 | 3 | 46 |
| 50C | D-3.20 | H-1.12 | 1 | 43 |
| 51C | I-1.07 | H-1.12 | 4 | 215 |
| 52C | I-1.61 | H-1.12 | 3 | 133 |

TABLE III-continued

Coal Refuse - 4.2% Solids

Dosage - ppm (real)

| Example | Cationic Flocculant(s) | Anionic Flocculant | Settling Rate (sec.) | Clarity (NTU) |
|---|---|---|---|---|
| 53C | I-2.14 | H-1.12 | 2 | 103 |
| 54 | I-1.07 A-0.22 | H-1.12 | 5 | 164 |
| 55 | I-1.61 A-0.25 | H-1.12 | 3 | 80 |
| 56 | I-2.14 A-0.30 | H.1.12 | 2 | 64 |

TABLE IV

Coal Refuse - 4.2% Solids

Dosage - ppm (real)

| Example | Cationic Flocculant(s) | Anionic Flocculant | Settling Rate (sec.) | Clarity (NTU) |
|---|---|---|---|---|
| 57C | A-0.55 | G-0.47 | 12 | 130 |
| 58C | A-0.83 | G-0.47 | 15 | 116 |
| 59C | A-1.11 | G-0.47 | 11 | 100 |
| 60C | A-0.83 | G-0.33 | 42 | 212 |
| 61C | A-0.83 | G-0.63 | 9 | 99 |
| 62C | A-0.83 | G-0.96 | 3 | 63 |
| 63C | A-0.83 | K-0.33 | 50 | 203 |
| 64C | A-0.83 | K-0.65 | 10 | 100 |
| 65C | A-0.83 | K-0.98 | 1 | 64 |
| 66C | A-0.83 | L-0.31 | 49 | 215 |
| 67C | A-0.83 | L-0.60 | 11 | 116 |
| 68C | A-0.83 | L-0.91 | 2 | 76 |
| 69C | A-0.83 | H-0.41 | 50 | 260 |
| 70C | A-0.83 | H-0.79 | 3 | 75 |
| 71C | A-0.83 | H-1.20 | 1 | 75 |
| 72C | A-0.83 | J-0.42 | 42 | 128 |
| 73C | A-0.83 | J-0.82 | 8 | 56 |
| 74C | A-0.83 | J-1.25 | 2 | 52 |
| 75 | I-0.88 A-0.26 | J-0.82 | 3 | 68 |
| 76 | I-1.13 A-0.33 | J-0.82 | 3 | 55 |
| 77 | I-1.34 A-0.39 | J-0.82 | 3 | 58 |
| 78 | I-0.88 A-0.26 | H-0.79 | 4 | 166 |
| 79 | I-1.13 A-0.33 | H-0.79 | 2 | 93 |
| 80 | I-1.34 A-0.39 | H-0.79 | 2 | 97 |

TABLE V

Coal Refuse - 4.0% Solids

Dosage - ppm (real)

| Example | Cationic Flocculant(s) | Anionic Flocculant | Settling Rate (sec.) | Clarity (NTU) |
|---|---|---|---|---|
| 81C | A-1.09 | G*-1.7 | 18 | 81 |
| 82C | A-1.09 | G*-3.3 | 7 | 49 |
| 83C | A-1.09 | G*-5.0 | 5 | 45 |
| 84C | A-1.09 | N-0.35 | 23 | 90 |
| 85C | A-1.09 | N-0.69 | 5 | 28 |
| 86C | A-1.09 | N-1.05 | 1 | 33 |
| 87 | I-1.21 A-0.18 | N-0.69 | 3 | 33 |
| 88 | I-1.44 A-0.21 | N-0.69 | 2 | 28 |

TABLE V-continued

Coal Refuse - 4.0% Solids

Dosage - ppm (real)

| Example | Cationic Flocculant(s) | Anionic Flocculant | Settling Rate (sec.) | Clarity (NTU) |
|---|---|---|---|---|
| 89 | I-1.89 A-0.27 | N-0.69 | 1 | 24 |
| 90C | A-1.09 | M-3.3 | 21 | 158 |
| 91C | A-1.09 | M-5.0 | 8 | 98 |
| 92C | A-1.09 | M-6.6 | 4 | 75 |
| 93C | A-1.09 | J-0.43 | 20 | 173 |
| 94C | A-1.09 | J-0.85 | 5 | 85 |
| 95C | A-1.09 | J-1.25 | 1 | 62 |
| 96 | I-1.21 A-0.013 | J-0.85 | 4 | 90 |
| 97 | I-1.55 A-0.17 | J-0.85 | 3 | 58 |
| 98 | I-1.89 A-0.22 | J-0.85 | 1 | 43 |

TABLE VI

Coal Refuse - Thickener Feed - 5% Solids

Dosage - ppm (real)

| Example | Cationic Flocculant(s) | Anionic Flocculant | Settling Rate (sec.) | Clarity (NTU) |
|---|---|---|---|---|
| 98C | 0-1.35 | K-0.69 | 26 | 60 |
| 99C | 0-2.10 | K-0.69 | 21 | 39 |
| 100C | 0-2.75 | K-0.69 | 16 | 34 |
| 101 | 0-1.35 A-0.26 | K-0.69 | 11 | 36 |
| 102 | 0-2.05 A-0.40 | K-0.69 | 12 | 28 |
| 103 | 0-2.75 A-0.54 | K-0.69 | 13 | 25 |

TABLE VII

Coal Refuse - High Refractory Clay - 5% Solids

Dosage - ppm (real)

| Example | Cationic Flocculant(s) | Anionic Flocculant | Settling Rate (sec.) | Clarity (NTU) |
|---|---|---|---|---|
| 104C | A-1.28 | K-0.36 | 134 | 84 |
| 105C | A-1.28 | K-0.69 | 64 | 60 |
| 106C | A-1.28 | K-1.07 | 31 | 49 |
| 107 | 0-2.05 A-0.34 | K-0.69 | 11 | 30 |
| 108 | 0-2.75 A-0.45 | K-0.69 | 5 | 18 |
| 109 | 0-3.44 A-0.56 | K-0.69 | 4 | 15 |
| 110C | A-2.14 | J-0.43 | 136 | 81 |
| 111C | A-2.14 | J-0.83 | 58 | 42 |
| 112C | A-2.14 | J-1.25 | 18 | 35 |
| 113 | 0-2.05 A-0.34 | J-0.83 | 9 | 32 |
| 114 | 0-2.75 A-0.45 | J-0.83 | 8 | 23 |
| 115 | 0-3.44 A-0.56 | J-0.83 | 4 | 15 |

TABLE VIII

Coal Refuse - Thickener Feed
Oxidized Strip Coal - 4% Solids

| Example | Cationic Flocculants(s) | Anionic Flocculant | Settling Rate (400/300/200 ml) (sec.) | Clarity (NTU) |
|---|---|---|---|---|
| 116C | A-1.92 | C-1.00* | 5/19/46 | 33 |
| 117C | 0-3.28 A-0.64 | C-1.00* | 5/13/33 | 12 |
| 118C | C-1.00* | 0-3.28 A-0.64 | 5/17/45 | 14 |
| 119C | 0.410 A-0.80 | C-0.50* | 6/17/45 | 16 |
| 120C | 0.2.46 A-0.48 | C-1.50* | 4/10/29 | 15 |
| 121C | 0-1.64 A-0.32 | C-2.00* | 3/6/19 | 12 |
| 122C | 0-1.64 A-0.32 | A-0.32 | 5/15/44 | 21 |

*= nonionic polymer

These data show that when a non-ionic polymer is used in lieu of an anionic polymer as per the present invention, on the particular feed involved, an oxidized strip coal which is known to be susceptible to non-ionic flocculation, higher amounts of flocculant must be employed in order to achieve results comparable to those of, for example, Table VII, Examples 107–109 and 113–115, in accordance with the present invention.

TABLE IX

Thickener Feed Blend 50/50 - 3.5% Solids

| Example | Cationic Flocculant(s) | Anionic Flocculant | Settling Rate (sec.) | Clarity (NTU) |
|---|---|---|---|---|
| 123C | A-2.72 | B-.31 | 9 | 178 |
| 124C | A-2.72 | B-.46 | 3 | 148 |
| 125C | A-2.72 | B-.62 | 1 | 113 |
| 126C | A-2.72 | E-.32 | 9 | 222 |
| 127C | A-2.72 | E-.48 | 4 | 140 |
| 128C | A-2.72 | E-.64 | 2 | 151 |
| 129 | 0-2.05 A-0.34 | F-.59 | 1 | 364 |
| 130 | 0-2.75 A-0.44 | F-.59 | 1 | 255 |
| 131 | 0.-3.44 A0.55 | F-.59 | 0.5 | 199 |

Examples 132 and 133

The procedure of Examples 16 and 17 is again followed except that Polymer G is replaced by 132) a copolymer of acrylamide (AM) and 2-acrylamido-2-methyl propane sulfonic acid (AMPSA) (85/15) of 15 million weight average molecular weight and 133) a copolymer as in Example 132 but of 50% AM and 50% AMPSA. In all instances, results similar to Examples 16 and 17 are achieved.

We claim:

1. A method of separating solids from a mineral slurry, which comprises:

a) adding a blend of a low molecular weight, cationic polymer flocculent and a high molecular weight, cationic polymer flocculent to a mineral slurry to form a substrate, b) adding to said substrate a high molecular weight, anionic polymer flocculent to form a settled solids phase and an aqueous phases and c) separating said solids and aqueous phases.

2. A method according to claim 1 wherein the high molecular weight anionic flocculant is a (meth) acrylic acid/(meth) acrylamide copolymer.

3. A method according to claim 1 wherein the high molecular weight cationic flocculant is an acryloxyalkytrimethylammonium halide/(meth)acrylamide copolymer.

4. The method according to claim 1 wherein said mineral slurry is coal refuse.

5. The method according to claim 1, wherein the high molecular weight cationic polymer flocculent has a weight average molecular weight of at least about 1,000,000, the low molecular weight polymer flocculent has a weight average molecular weight of no more than about 1,000,000, and the high molecular weight anionic polymer flocculent has a weight average molecular weight of at least about 5,000,000.

6. The method according to claim 1, wherein the high molecular weight cationic polymer flocculent has a weight average molecular weight of at least about 3,000,000, the low molecular weight polymer flocculent has a weight average molecular weight of no more than about 750,000, and the high molecular weight anionic polymer flocculent has a weight average molecular weight of at least about 10,000,000.

7. The method according to claim 1 wherein the low molecular weight cationic flocculant is a diallyl dimethyl ammonium chloride polymer.

8. A method according to claim 7 wherein the high molecular weight anionic flocculant is a (meth) acrylic acid/(meth) acrylamide copolymer.

9. A method according to claim 1 wherein the high molecular weight cationic flocculant is a quaternized Mannich acrylamide polymer.

10. A method according to claim 9 wherein the high molecular weight anionic flocculant is a (meth) acrylic acid/(meth) acrylamide copolymer.

11. A method according to claim 9 wherein the low molecular weight cationic flocculant is a diallyl dimethyl ammonium chloride polymer.

12. A method according to claim 11 wherein the high molecular weight anionic flocculant is a (meth) acrylic acid/(meth) acrylamide copolymer.

* * * * *